United States Patent
Luo et al.

(10) Patent No.: US 12,555,321 B1
(45) Date of Patent: Feb. 17, 2026

(54) TWO DIMENSIONAL AND THREE DIMENSIONAL PRIMITIVE PROCESSING TO DETERMINE A TWO DIMENSIONAL PLAN

(71) Applicant: Amazon Technologies, Inc., Seattle, WA (US)

(72) Inventors: Yu Luo, Mountain View, CA (US); Chen Hu, Milpitas, CA (US); Jhih-Yuan Lin, New Taipei (TW); Meng-Jiun Chiou, Taipei (TW); Chih-Ting Liu, Taipei (TW); Dawei Li, San Jose, CA (US); Shao-Hang Hsieh, Taoyuan (TW); Yang Liu, Saratoga, CA (US); Kah Kuen Fu, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 18/541,326

(22) Filed: Dec. 15, 2023

(51) Int. Cl.
*G06T 17/10* (2006.01)

(52) U.S. Cl.
CPC .................... *G06T 17/10* (2013.01)

(58) Field of Classification Search
CPC ...................................... G06T 17/10
See application file for complete search history.

(56) References Cited

U.S. PATENT DOCUMENTS

| | | | |
|---|---|---|---|
| 2019/0026956 A1* | 1/2019 | Gausebeck | G06T 7/593 |
| 2019/0205485 A1* | 7/2019 | Rejeb Sfar | G06F 30/13 |
| 2021/0073449 A1* | 3/2021 | Segev | G06F 30/27 |
| 2023/0106339 A1* | 4/2023 | Goyal | G06T 7/13 |
| | | | 345/634 |
| 2024/0386524 A1* | 11/2024 | Hefazi | G06T 11/00 |
| 2025/0200873 A1* | 6/2025 | Lin | G06T 17/00 |
| 2025/0265780 A1* | 8/2025 | Núñez | G06T 7/536 |

* cited by examiner

*Primary Examiner* — Nurun Flora
(74) *Attorney, Agent, or Firm* — Kilpatrick Townsend & Stockton LLP

(57) ABSTRACT

Techniques for two dimensional and three dimensional primitive processing to determine a two dimensional plan are described herein. In an example, first two-dimensional (2D) primitives associated with a room are determined based on an image frame defined in an image space as an input to a machine learning model. The first 2D primitives are of different types. A first three-dimensional (3D) primitive corresponding to the first 2D primitives is determined based on camera pose data associated with the image frame and the first 2D primitives. A 2D projection of the first 3D primitive onto a projection plane is determined based on 2D contour of the room defined in the projection plane. The 2D projection includes second 2D primitives. A 2D plan associated with the room is generated based on the second 2D primitives.

20 Claims, 12 Drawing Sheets

TWO DIMENSIONAL AND THREE DIMENSIONAL PRIMITIVE PROCESSING TO DETERMINE A TWO DIMENSIONAL PLAN

BACKGROUND

Two-dimensional plans of floors of spaces may be created for various reasons. For instance, a two-dimensional floor plan may be generated so a user can visualize a space or plan a way to utilize the space. In addition, a two-dimensional floor plan may be used to determine how the floor plan may be modified during a renovation process. In any case, it may be desirable to efficiently produce a two-dimensional plan with minimal manual input.

BRIEF DESCRIPTION OF THE DRAWINGS

Various embodiments in accordance with the present disclosure will be described with reference to the drawings, in which.

DETAILED DESCRIPTION

Figure 1:
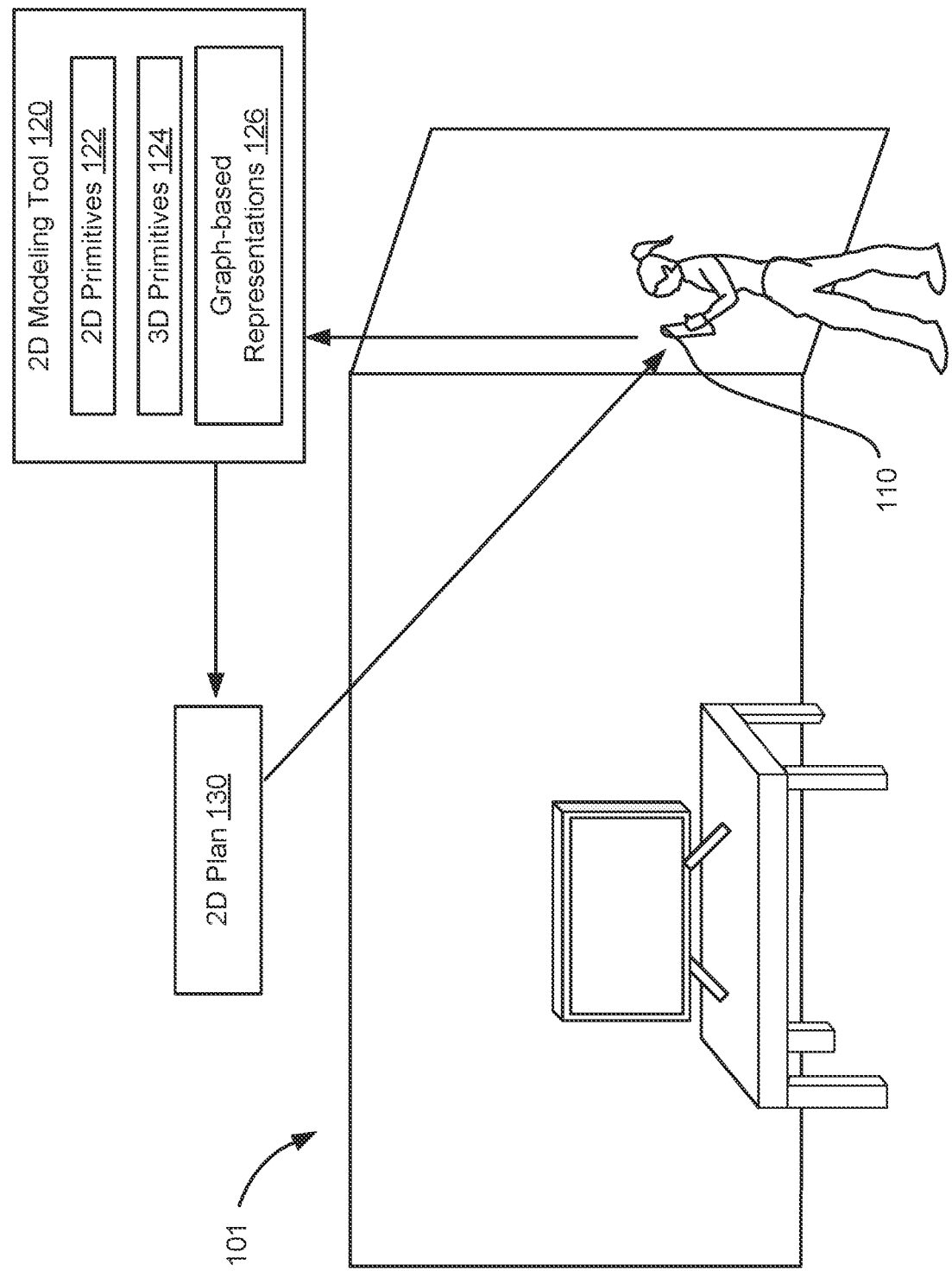
FIG. 1 illustrates two-dimensional plan generation from two-dimensional and three-dimensional primitives according to an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, techniques are described herein for two-dimensional (2D) and three-dimensional (3D) primitive processing to determine a 2D plan. In an example, a computer system determines first 2D primitives (e.g., a corner, a line, a point, etc.) associated with a room based on using an image frame defined in an image space as an input to a machine learning (ML) model. A 3D primitive corresponding to the first 2D primitives is determined based on camera pose data (e.g., six degrees of freedom and intrinsics and extrinsics of a camera that generated the image frame) associated with the image frame and the first 2D primitives. The computer system determines a 2D projection (e.g., a bird view) of the 3D primitive into a projection plane based on a 2D contour of the room that is defined in the projection plane. The 2D projection includes second 2D primitives. A 2D plan of a floor of the room is generated based on the second 2D primitives. The 2D plan can be generated based on primitive registration, primitive filtering, primitive clustering, and graph-based searching of a graph.

To illustrate, consider the example of a modeling tool generating a floor plan of a kitchen in a house. A camera of a smartphone can be used to take a video showing the kitchen. The modeling tool can receive the video and input individual image frames into an ML model to determine 2D primitives in each image frame. For instance, a frame may include 2D primitives corresponding to a floor corner, a floor line, and a door point. The modeling tool then determines a 3D primitive for each of the 2D primitives and generates a 2D projection of the 3D primitives in a projection plane, where the 2D projection includes new 2D primitives corresponding to the floor corner, the floor line, and the door point. The modeling tool can register the new 2D primitives in a 3D mesh of the room and/or in a plane of the room. Once the 2D primitives are registered, the 2D primitives can be filtered based on various matching criteria to reduce false positive 2D primitives. Once 2D primitives from all frames of the video are filtered, the remaining 2D primitives can be clustered so that the same 2D primitives from different image frames are grouped together and similar 2D primitives are merged. The modeling tool can then associate clusters with nodes of a graph and perform graph-based searching of the graph to determine a perimeter and generate the 2D floor plan of the kitchen.

Embodiments described herein provide several technical advantages over conventional techniques. For example, conventional techniques may rely on manual construction of 2D plans, which can be time-consuming and imprecise. In addition, depth sensors may be needed to collect a 3D point cloud of each room. Embodiments of the disclosure provide 2D plan generation reduce manual input. Additionally, a depth sensor is not needed. The techniques also provide acceleration to graph-based searching through storage of node connections. As such, processing requirements for the graph-based searching may be reduced, while providing the same if not better 2D plan estimation.

FIG. 1 illustrates 2D plan generation from 2D and 3D primitives according to an embodiment of the disclosure. A camera of a device 110 generates a video showing a room 101. A user can generate the video by scanning the room 101 with the camera. The room 101 can be in a space. For instance, the room 101 may be a living room in a house. The video may also show other rooms (e.g., a kitchen, bathroom, bedroom, office, etc.) in the same space.

A 2D modeling tool 120 receives the video from the device 110 and generates the 2D plan 130 based on the video. In some instances, the 2D modeling tool 120 may be on the device 110 or may be a remote computer system. The 2D modeling tool 120 can determine 2D primitives 122 and 3D primitives 124 associated with the room 101. The 2D primitives 122 can be geometric shapes defined in an image plane that are building blocks for creating geometric objects. In a room, the 2D primitives 122 can correspond to corner points, lines, doors, etc. For instance, the 2D primitives 122 can represent a floor corner point, a floor line, a ceiling corner point, a ceiling line, and an object. A floor corner point is a corner that connects a ground plane and two wall planes. A ceiling corner point is a corner that connects a ceiling plane and two wall planes. A floor line is a line that connects a ground plane and a wall plane. A ceiling line is a line that connects a ceiling plane and a wall plane. An object may be a door, opening, or window, where a door or opening is a door size opening structure on a wall represented by four key points and a window is a window size opening structure on a wall represented by four key points. The 2D primitives 122 may also include a structural corner, a wall line, a structural line, and a stair line. A structural corner is a corner that connects two walls and a plane which is parallel to a ground plane. This horizontal plane is typically from an unmovable structure (e.g., inner corner of a countertop) rather than from common furniture (e.g., a table). A wall line is a line that connects two wall planes. A structural line is a line that connects a wall plane and a plane that is parallel to a ground plane. A stair line is a line that connects the entry or exit step of stairs that is parallel to a current floor ground plane.

In an example, the 3D primitives 124 correspond to the 2D primitives 122. The 2D modeling tool 120 can determine the 3D primitives 124 by using camera pose data associated with the image frame and the 2D primitives 122. The 2D modeling tool 120 can also determine the 3D primitives 124 from a 3D model representation of the room 101 and/or a set of ceiling and floor planes of the room 101. The 3D model representation may be a mesh or a point cloud of the room 101. From the 3D model representation, a 2D contour of the room 101 can be determined. The 2D contour is defined in a projection plane, such as a floor plane.

In an example, the 2D modeling tool 120 can determine or receive the 2D contour of the room 101. The 2D modeling tool 120 can then determine a 2D projection of the 3D primitives 124 onto the projection plane. The 2D projection can be a 2D bird view projection that includes another set of 2D primitives at scale (e.g., they include X, Y coordinates that represent their location in 2D space on the floor plane) in the projection plane that can be connected to each other as graph-based representations 126 to generate the 2D plan 130 of a floor of the room 101. Upon generating the 2D plan 130, the 2D modeling tool 120 can cause the 2D plan 130 to be presented on a user interface of the device 110. In an example, a second image frame from a second portion of the video can show a second room (e.g., a kitchen). Following the same process using the 2D modeling tool 120, a second 2D plan associated with the second room can be generated. The 2D modeling tool 120 can determine that a 2D primitive is common between the room 101 and the second room and that it is of a particular type (e.g., a door, an opening, etc.). Upon determining that the 2D primitive is common and of the particular type, the 2D modeling tool 120 can generate a relative arrangement between the 2D plan 130 and the second 2D plan. The relative arrangement may correspond to the room 101 and the second room being adjacent to each other.

Figure 2:
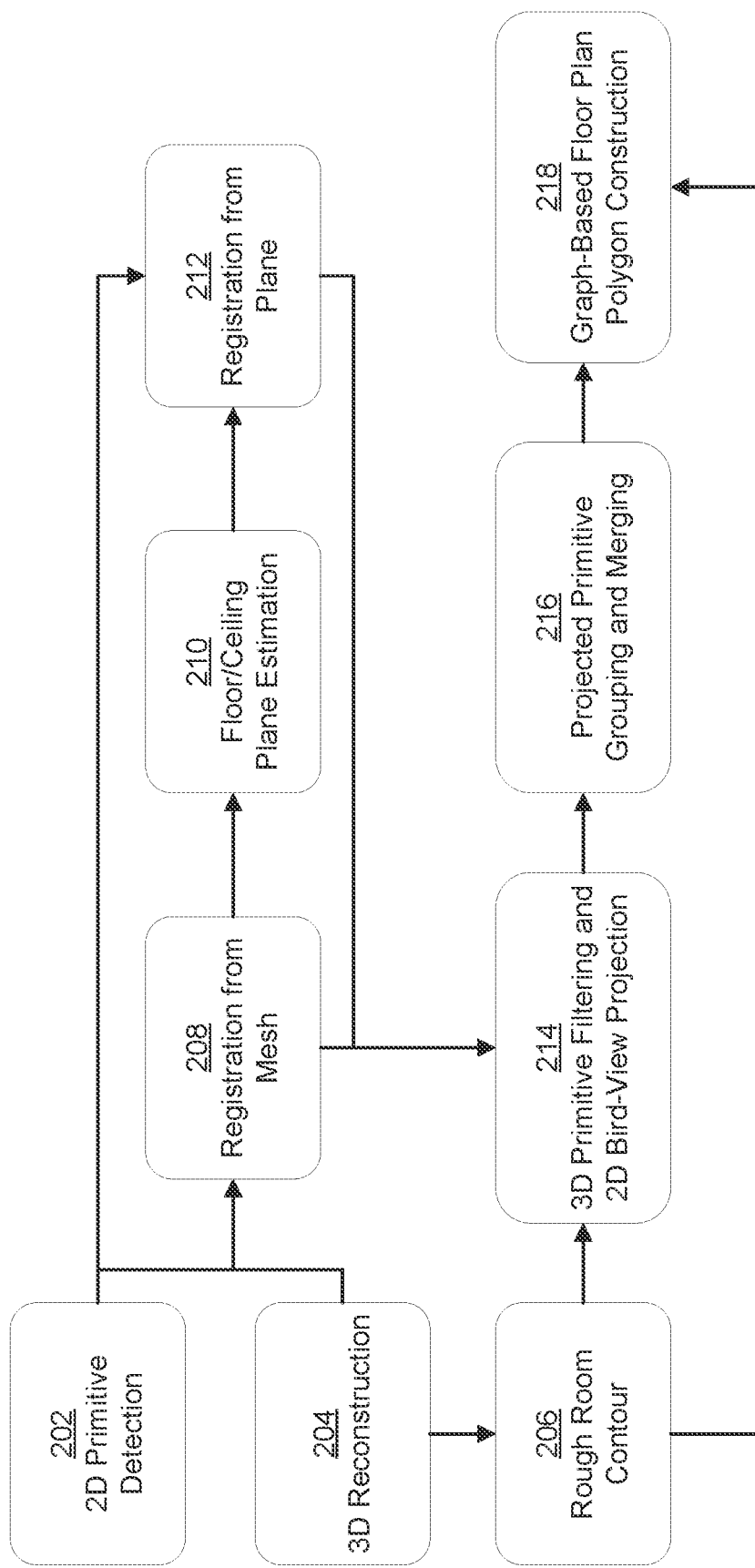
FIG. 2 illustrates an example flow diagram for two-dimensional plan generation from two-dimensional and three-dimensional primitives according to an embodiment of the disclosure.

FIG. 2 illustrates an example flow diagram for two-dimensional plan generation from two-dimensional and three-dimensional primitives according to an embodiment of the disclosure. Steps of the flow diagram may be performed by a 2D modeling tool (e.g., 2D modeling tool 120 in FIG. 1) running on a user device or a computer system.

In an example, the flow involves step 202 of 2D primitive detection. The 2D modeling tool may include a machine learning model (or, equivalently, an artificial intelligence model) that receives individual image frames of a video showing a room as input and identifies 2D primitives (e.g., lines, corners, door, etc.) in an image plane in the image frames. The ML model may be implemented as a deep learning model in one example. Having granular 2D primitives of different types can allow the 2D modeling tool to perform a type of fusion that improves the accuracy of a generated 2D plan. For example, the 2D primitives can include a ceiling corner point, but a corresponding floor corner point may not be included in the 2D primitives because it may be occluded in the image by an object (e.g., by being behind a couch). By registering the ceiling corner point in a 3D space and then projecting it onto a projection plane (e.g., the floor plane), the 2D modeling tool creates a pseudo-floor corner point with the proper scale information (e.g., X, Y coordinates), and it can be used in the 2D plan estimation.

The flow also involves step 204 of 3D reconstruction, which can result in a 3D model representation of the room. The 3D model representation may be generated by raw sensor data fusion (e.g., depth fusion from a depth sensor) or by an ML model such as NeuralRecon. A rough room contour can be determined in step 206 from the 3D model representation. For instance, the 3D model representation can be projected into the projection plan and the boundary of the projection can be found, which represents the 2D contour defined in the projection plane.

Step 208 relates to registration of the 2D primitives from a 3D model representation of the room, step 210 relates to floor and ceiling plane estimation, and step 212 relates to registration of 2D primitives from a plane. Each of these steps is part of 2D primitive registration, which is described in detail in FIGS. 3-4. Similarly, step 214 relates to 3D primitive filtering and 2D bird view projection, which is described in detail in FIGS. 5-6. Step 216 relates to projected primitive grouping and merging, which is described in detail in FIGS. 7-8, and step 218 relates to graph-based floor plan polygon construction, which is described in detail in FIGS. 9-10.

Figure 3:
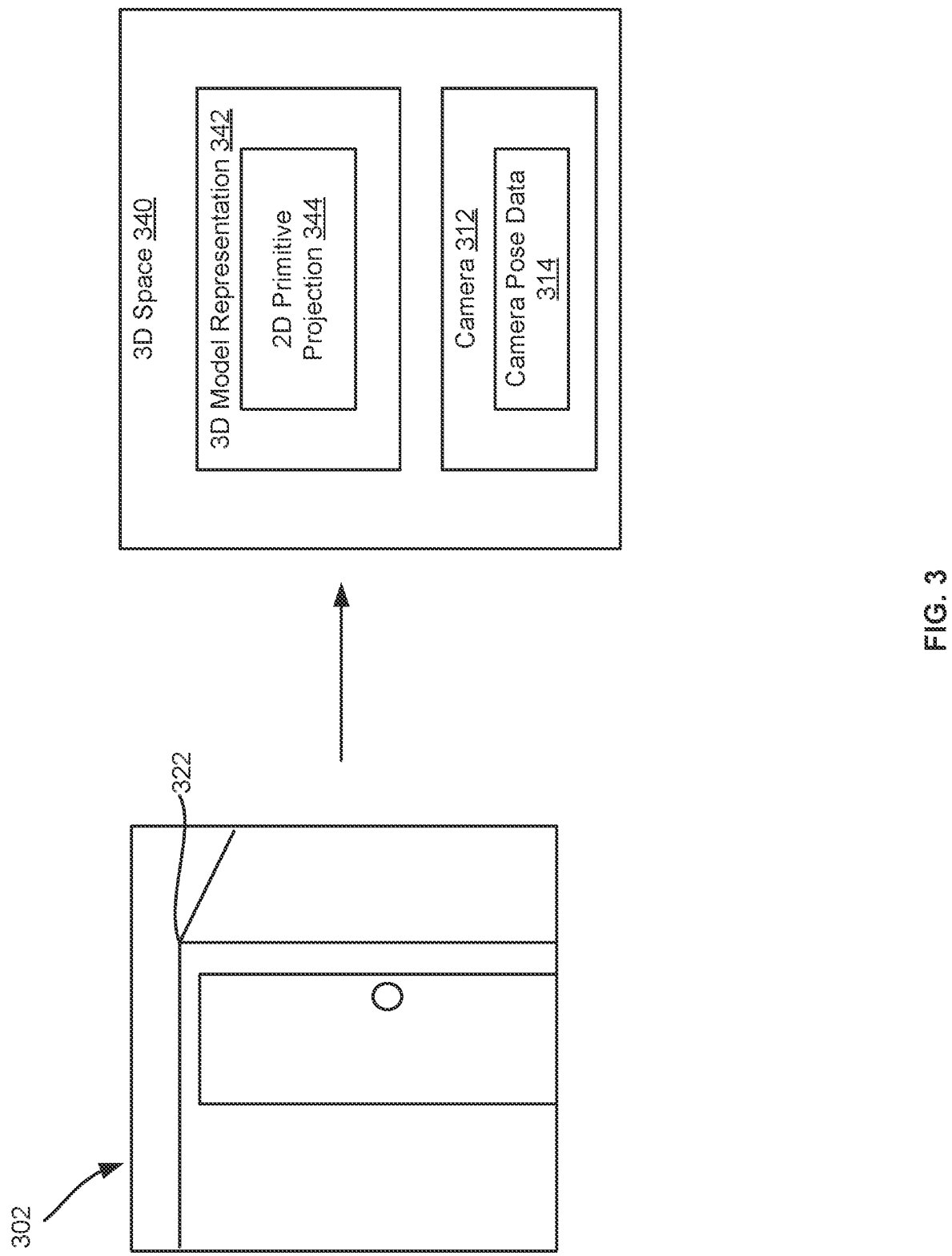
FIG. 3 illustrates primitive registration in floor plan generation according to an embodiment of the disclosure.

FIG. 3 illustrates primitive registration in floor plan generation according to an embodiment of the disclosure. A modeling tool (e.g., modeling tool 120 in FIG. 1) can receive an image 302 showing a room. The image 302 is a 2D image in a 2D image space and is generated by a camera 312 in a 3D space 340 that includes the room. The camera 312 includes camera pose data 314, which is six degree of freedom data as well as camera intrinsics and extrinsics. Examples of the camera intrinsics include optical center, focal point, field of view, etc., and examples of the camera extrinsics include parameters based on the location and orientation of the camera 312. The image 302 can show one or more 2D primitives (e.g., a line, a corner point, etc.). For instance, the image 302 is illustrated as showing 2D primitive 322, which is a ceiling corner. The 2D modeling tool may perform the registration using a 3D model representation and/or a plane.

In an example, the 3D space 340 also has a 3D model representation 342 (e.g., a mesh or point cloud) of the room. The 2D primitive 322 is projected as a 2D primitive projection 344 onto the 3D model representation 342. The 2D modeling tool can register the 2D primitive 322 into the 3D space 340 based on the camera pose data 314 and the 3D model representation 342. In some instances, the 2D modeling tool may use ray tracing to generate the 2D primitive projection 344. In an example in which the image 302 includes a 2D primitive of a line, registering the 2D primitive can involve determining 2D points that belong to the line based on a sampling of the line. Each of the 2D points can be registered into the 3D space 340 such that 3D points are determined. A 3D primitive can then be estimated based on an iterative method (e.g., random sample consensus (RANSAC)) being applied to the 3D points.

To register 2D primitives from a plane, the 2D modeling tool can register a 2D primitive into a plane based on the camera pose data 314 using ray casting. Multiple 2D primitives may be registered into the plane. For instance, two 2D primitives representing floor points can be projected onto a floor plane. 3D primitives can then be determined from the projected 2D primitives and a 2D plan can be generated based on the plane. For example, two floor plane 3D primitives can define a floor plane for the 2D plan.

Figure 4:
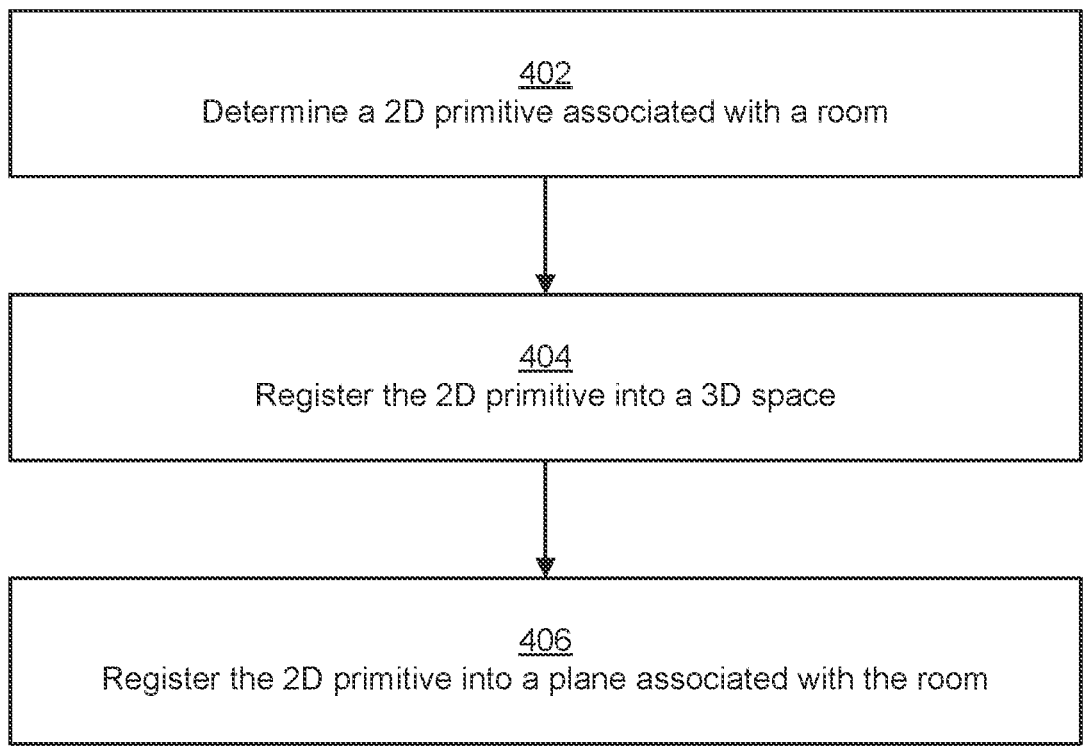
FIG. 4 illustrates an example flow of a process for primitive registration in floor plan generation according to an embodiment of the disclosure.

FIG. 4 illustrates an example flow of a process for primitive registration in floor plan generation according to an embodiment of the disclosure. In some embodiments, the process may be performed by a computer system described herein (e.g., device 110 of FIG. 1). The process (described below) is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 402, where the computer system determines a 2D primitive associated with a room. The 2D primitive can be determined based on an image frame of a video showing the room being input to an ML model. The 2D primitive can be defined in an image space.

In an example, the flow includes operation 404, where the computer system registers the 2D primitive into a 3D space. The 2D primitive can be registered into the 3D space based on camera pose data and a 3D model representation of the room that is defined in the 3D space.

In an example, the flow includes operation 406, where the computer system registers the 2D primitive into a plane associated with the room. Planes (e.g., a floor plane and a ceiling plane) of the room can be determined from the image frame and the 2D primitive can be registered into a plane based on the camera pose data. The 2D primitive may be registered into the plane using ray casting.

In an example, given a set of detected 2D primitives from images of a room, the 2D primitives are registered into 3D spaces with different approaches including registration from mesh and registration from plane. Registration from mesh mainly leverages an estimated 3D scene mesh to render depth from each image's camera pose. With the depth information, a pixel/point can be registered in the world coordinate system with camera intrinsics and extrinsics. Naively, a line may be registered into 3D space by registering two end points of the line. However, the naive registration process can lead to unrealistic lines due to the noise of the depth itself. To mitigate the issue, N points from a line are uniformly resampled, registered into the 3D space, and a 3D line segment is estimated using RANSAC. The estimated 3D line segment can be further validated by inlier ratio and spacing distribution. With such a process, a line in the image plane can be reliably registered into 3D space. After registering all lines from the mesh, floor and ceiling planes are estimated using RANSAC with floor and ceiling lines. Ceiling lines may not lie in the same plane for buildings that have inclined ceilings or suspended ceilings. Inlier ratio during plane estimation is used to indicate if the plane can be used for registration. Whenever there's a valid floor or ceiling plane, a floor or ceiling line or corner detected in the 2D image can be registered into 3D space by ray casting the pixel into the corresponding plane with camera intrinsics and extrinsics. Apart from the above two registration approaches, registration from triangulation may also be used. Registration from triangulation involves triangulating points and lines when observing the same point or line from different camera viewpoints. In summary, registration from mesh yields robustly registered 3D lines that are well-constructed in the estimated 3D mesh, while registration from plane registers every detected line and corner without differentiating false positives.

Figure 5:
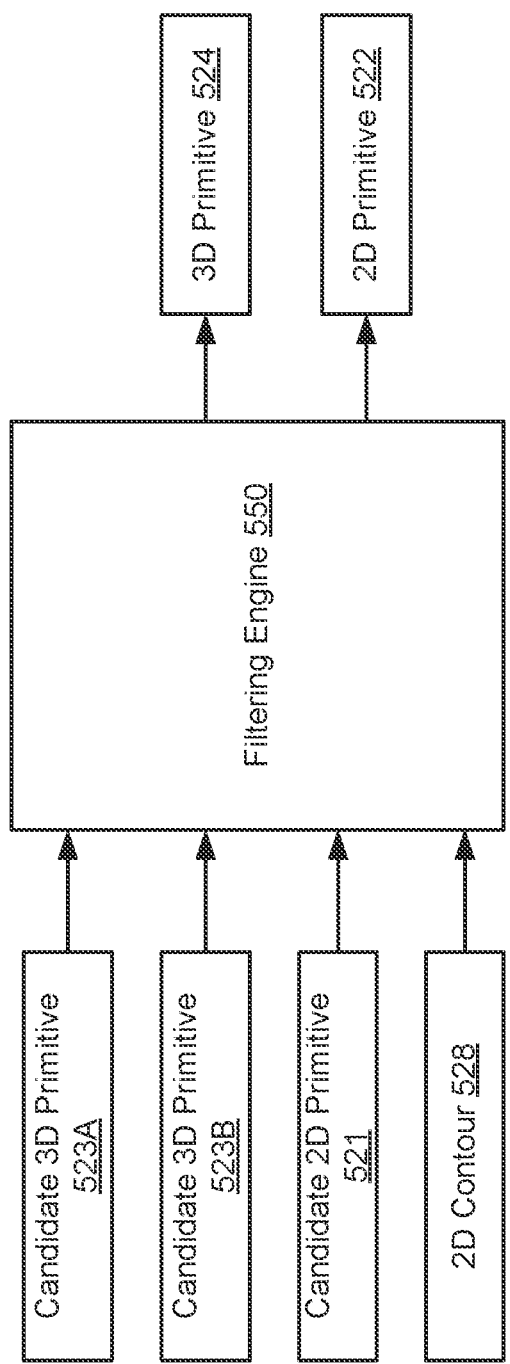
FIG. 5 illustrates primitive filtering in floor plan generation according to an embodiment of the disclosure.

FIG. 5 illustrates primitive filtering in floor plan generation according to an embodiment of the disclosure. A modeling tool (e.g., modeling tool 120 in FIG. 1) can include a filtering engine 550 that performs the primitive filtering. In general, primitive filtering relates to filtering out false positive primitives from true positive primitives.

In an example, candidate 3D primitive 523A may be determined from registering a 2D primitive into a 3D space based on camera pose data and a 3D model representation of a room. In addition, candidate 3D primitive 523B may be determined from registering the 2D primitive into a plane (e.g., a floor or ceiling plane) associated with the room. The filtering engine 550 can receive the candidate 3D primitives 523A-523B and determine whether they should be kept as a 3D primitive or removed. The 3D primitive may be kept if it is consistently registered. So, the filtering engine 550 can determine whether there is a match between the candidate 3D primitives 523A-523B. If there is a match, the filtering engine 550 can set a 3D primitive 524 as one of the candidate 3D primitives 523A-523B. If there is not a match, the filtering engine 550 may remove the candidate 3D primitives 523A-523B.

Additional filtering may be performed based on a 2D projection into a projection plane of the candidate 3D primitives that were not removed. The 2D projection can be set as including a candidate set of 2D primitives 521. The filtering engine 550 receives the 2D projection (or candidate set) and the 2D contour 528. The filtering engine 550 can determine whether there is a match between each candidate 2D primitive 521 and the 2D contour 528 or not. If there is a match, the filtering engine 550 can set a 2D primitive 522 as the candidate 2D primitive 521. Otherwise, the filtering engine 550 may remove the candidate 2D primitive 521. If the candidate 2D primitive 521 is a point, the match can be how close (e.g., the shortest distance) the point is to the 2D contour 528. If the distance is less than a threshold, there is a match. If the candidate 2D primitive 521 is a line, determining a match may involve a direction match. If an angle between the line and the 2D contour 528 is less than a threshold, and an orthogonal distance between the line and the 2D contour 528 is less than another threshold, there is a match.

A candidate 2D primitive may also be removed based on its type. The filtering engine 550 can receive the candidate 2D primitive 521 and determine a type of the candidate 2D primitive 521. For instance, the type may be a door, a window, a corner, a floor line, a ceiling line, etc. Based on the candidate 2D primitive 521 being a particular type (e.g., a door), the filtering engine 550 can remove the candidate 2D primitive 521. Or, based on the candidate 2D primitive 521 being another type (e.g., a floor line), the filtering engine 500 can set the 2D primitive 522 as the candidate 2D primitive 521.

Figure 6:
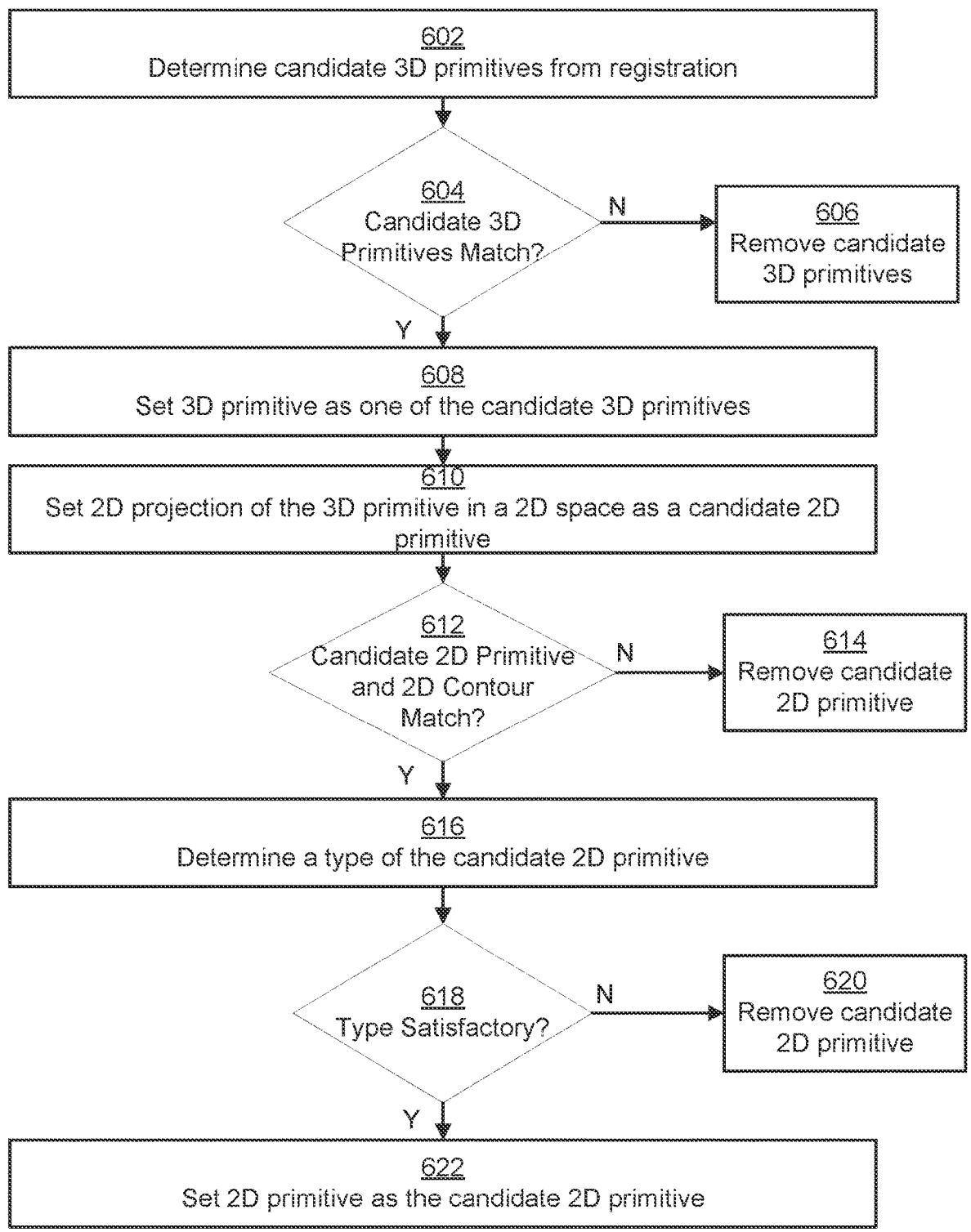
FIG. 6 illustrates an example flow of a process for primitive filtering in floor plan generation according to an embodiment of the disclosure.

FIG. 6 illustrates an example flow of a process for primitive filtering in floor plan generation according to an embodiment of the disclosure. In some embodiments, the process may be performed by a computer system described herein (e.g., device 110 of FIG. 1). The process (described below) is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

In an example, the flow includes operation 602, where the computer system determines candidate 3D primitives from registration. A first 3D primitive can be determined by registering a 2D primitive into a 3D space based on camera pose data and a 3D model representation of a room. A second 3D primitive can be determined by registering the 2D primitive into a plane associated with the room.

In an example, the flow includes operation 604, where the computer system determines whether the candidate 3D primitives match. The computer system may determine a closeness (e.g., distance) between the candidate 3D primitives and if it is below a threshold, the candidate 3D primitives can be determined to match. If there is a match, the flow can proceed to operation 608. Otherwise, the flow can proceed to operation 606.

In an example, the flow includes operation 606, where the computer system removes the candidate 3D primitives. Removing the candidate 3D primitives can reduce the primitives that are subsequently grouped and used to generate a 2D plan.

In an example, the flow includes operation 608, where the computer system sets a 3D primitive as one of the candidate 3D primitives. Since there is a match, the 3D primitive can be considered to be a geometrically significant feature in the room. The 3D primitive may be set as the first candidate 3D primitive or the second candidate 3D primitive.

In an example, the flow includes operation 610, where the computer system sets a 2D projection of the 3D primitive in a projection plane as a candidate 2D primitive. The 2D projection is determined based on a 2D contour of the room.

In an example, the flow includes operation 612, where the computer system determines whether the candidate 2D primitive and the 2D contour match. For a point, if the shortest distance between the candidate 2D primitive and the 2D contour is less than a threshold, there can be a match. For a line, if the angle between the candidate 2D primitive and the 2D contour is less than a threshold and the orthogonal distance between the candidate 2D primitive and the 2D contour is less than a threshold, there can be a match. If there is a match, the flow can proceed to operation 616. Otherwise, the flow can proceed to operation 614.

In an example, the flow includes operation 614, where the computer system removes the candidate 2D primitive.

In an example, the flow includes operation 616, where the computer system determines a type of the candidate 2D primitive. The computer system may determine that the candidate 2D primitive is part of a set of four 2D primitives that make up a door or window sized feature. So, the computer system can determine that the type of the candidate 2D primitive is an object.

In an example, the flow includes operation 618, where the computer system determines whether the type is satisfactory. The computer system can compare the type to a set of satisfactory types. If the type is included in the set, the type is satisfactory. If not, the type is not satisfactory. For instance, an object type may not be satisfactory. If the type is satisfactory, the flow can proceed to operation 622. Otherwise, the flow can proceed to operation 620.

In an example, the flow includes operation 620, where the computer system removes the 2D candidate primitive.

In an example, the flow includes operation 622, where the computer system sets a 2D primitive as the candidate 2D primitive. The 2D primitive is set as the candidate 2D primitive based on the type and/or the candidate 2D primitive and the 2D contour matching.

In an example, false positive primitives are filtered based on a rough room contour generated from 3D reconstruction (e.g., acquired from either raw sensor data fusion or 3D reconstruction methods like NeuralRecon and NeRF), primitive prioritization; and primitive sanity check. Given rough room contour, primitives that are far away from the contour and lines whose direction doesn't roughly align with the contour's marching direction are filtered out. Each primitive can potentially be registered with both registration approaches. Primitive prioritization checks registration consistency between different registration approaches and assigns a higher confidence for consistent ones. In addition, primitives that lie within doors, openings, or windows are remove during primitive prioritization since only primitives within the current room are desired for generating the room's floor plan. Primitive sanity check filters unrealistic primitives based on geometric common sense (e.g., a floor line should lie in floor plane, a wall line should be perpendicular to the floor plane, etc.).

Figure 7:
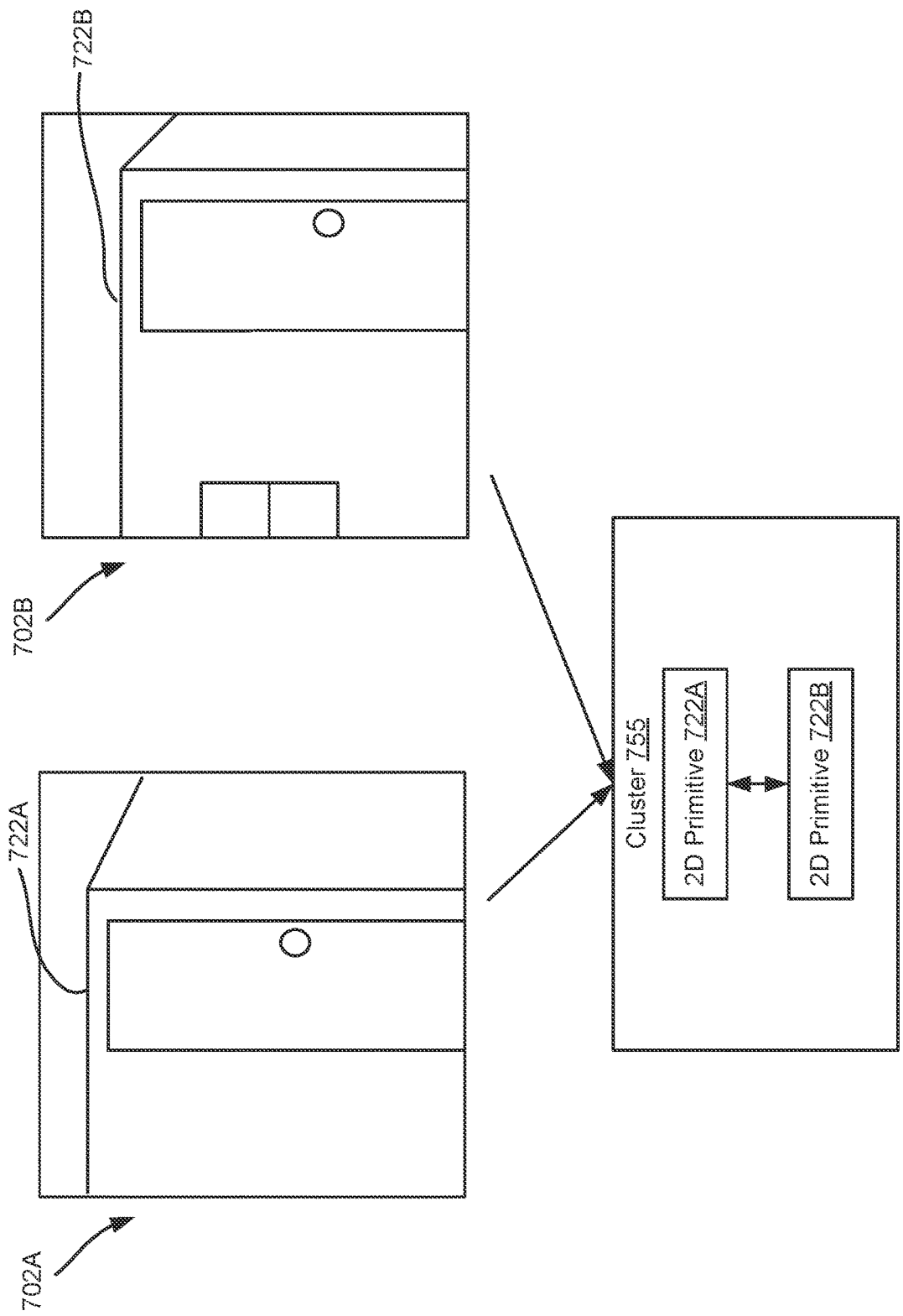
FIG. 7 illustrates primitive clustering in floor plan generation according to an embodiment of the disclosure.

FIG. 7 illustrates primitive clustering in floor plan generation according to an embodiment of the disclosure. Images 702A-702B are captured of a room in a 3D space. For instance, image 702A may be a first image frame of a video showing the room and image 702B may be a second image frame of the video. As illustrated, the image 702B may be generated by a camera while the camera scans towards the left in the room after capturing image 702A.

In an example, the same 2D primitives may be captured in different image frames. That is, 2D primitive 722A in image 702A and 2D primitive 722B in image 702B may both correspond to a ceiling line of the room. A 2D modeling tool (e.g., 2D modeling tool 120 in FIG. 1) may perform grouping and merging of 2D primitives across image frames to reduce the number of 2D primitives that are used in generating a floor plan. As previously described, the 2D modeling tool can generate a 2D projection including 2D primitives for each image frame. For instance, a 2D projection associated with the image 702A can include the 2D primitive 722A and a 2D projection associated with the image 702B can include the 2D primitive 722B.

The 2D modeling tool can associate the 2D primitive 722A and the 2D primitive 722B in a cluster 755. To associate the 2D primitives 722A-722B in the cluster 755, the 2D modeling tool can perform hierarchical clustering on the 2D primitives 722A-722B based on a distance between the line of the 2D primitive 722A and the line of the 2D primitive 722B. In addition, the 2D modeling tool can perform hierarchical clustering on the 2D primitives 722A-722B based on a direction of the line of the 2D primitive 722A and a direction of the line of the 2D primitive 722B.

Figure 8:
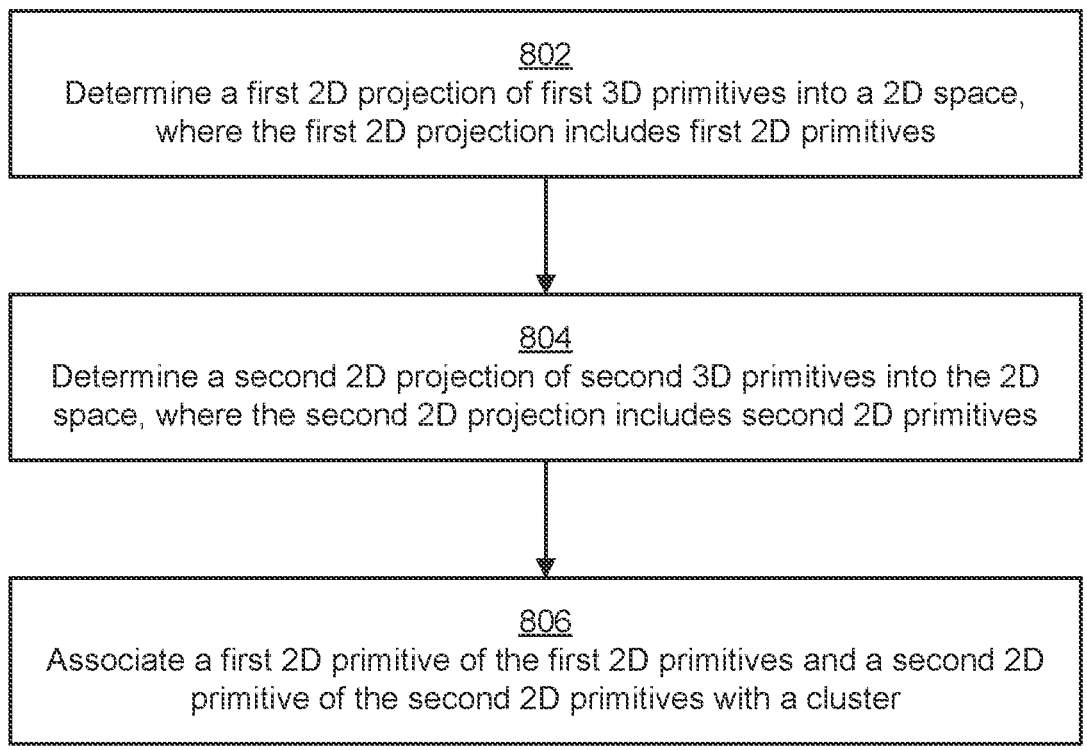
FIG. 8 illustrates an example flow of a process for primitive clustering in floor plan generation according to an embodiment of the disclosure.

FIG. 8 illustrates an example flow of a process for primitive clustering in floor plan generation according to an embodiment of the disclosure. In some embodiments, the process may be performed by a computer system described herein (e.g., device 110 of FIG. 1). The process (described below) is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

In an example, the flow includes operation 802, where the computer system determines a first 2D projection of first 3D primitives into a projection plane, and where the first 2D projection includes first 2D primitives. The first 2D projection is based on a first image frame and a 2D contour defined in the projection plane indicated by a 3D model representation.

In an example, the flow includes operation 804, where the computer system determines a second 2D projection of second 3D primitives into the projection plane, and where the second 2D projection includes second 2D primitives. The second 2D projection is based on a second image frame and the 2D contour.

In an example, the flow includes operation 806, where the computer system associates a first 2D primitive of the first 2D primitives and a second 2D primitive of the second 2D primitives with a cluster. The computer system can perform hierarchical clustering on the first 2D primitive and the second 2D primitive to determine the association. The hierarchical clustering can be based on a distance between the first 2D primitive and the second 2D primitive and directions of the first 2D primitive and the second 2D primitive.

In an example, a same physical line in the 3D space could be captured at various viewpoints and their registered 3D lines may not span within the exact the same position due to the imperfect 3D reconstruction and camera poses. Primitive clustering is intended to group primitives that are geometrically close or approximately collinear to each other and merge them into one single primitive. Grouping and merging points is relatively straightforward as the Euclidean distance can be used to measure the closeness between points. For lines, a cascaded agglomerative clustering is used for efficient and robust grouping. Specifically, an orthogonal distance is calculated between each pair of the lines and agglomerative clustering is conducted over the manifold defined by the pair wise orthogonal distance. A pair wise line angle within each cluster is computed and agglomerative clustering is conducted over the manifold defined by the pair wise line angle. Each cluster under the second agglomerative clustering is deemed as approximately collinear. To merge lines under the same cluster into one single line, the line's direction is estimated by taking the mean of all lines' unit directional vector. The merged line is finalized by taking the mean of each line's projection on a plane as one of the points lies on the merged line. The plane is spanned by the mean of all lines' endpoint and the estimated direction as normal.

Figure 9:
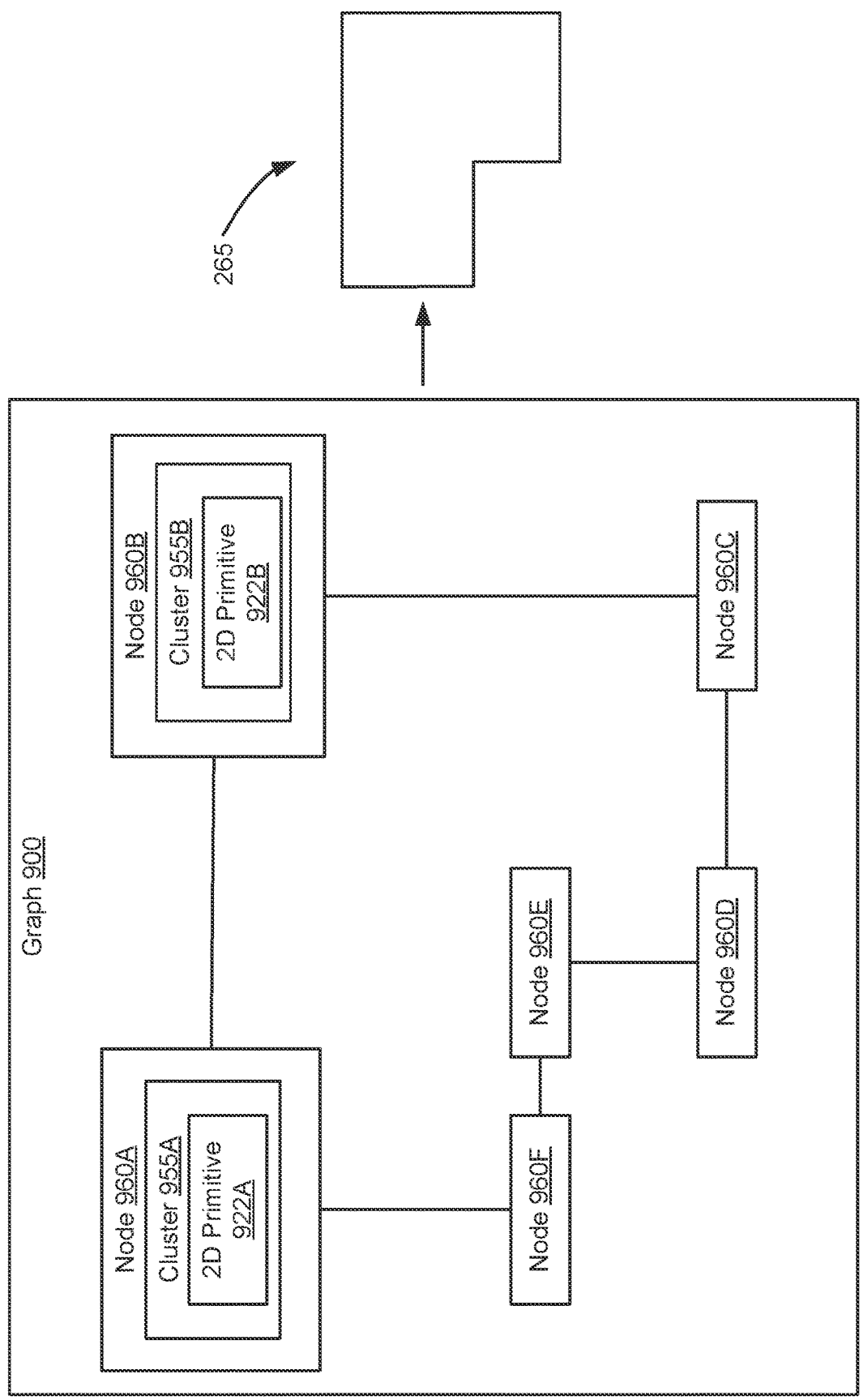
FIG. 9 illustrates graph-based searching in floor plan generation according to an embodiment of the disclosure.

FIG. 9 illustrates graph-based searching in floor plan generation according to an embodiment of the disclosure. A 2D modeling tool (e.g., 2D modeling tool 120 in FIG. 1) can receive clusters of primitives generated as described in FIGS. 7-8. Each cluster can be associated with a node of a graph 900. So, as shown in FIG. 9, the graph 960 can include six nodes 960A-960B. For simplicity, only nodes 960A-960B are shown as including clusters 955A-955B of 2D primitives 922A-922B, but it should be understood that each of the nodes 960C-960F similarly are associated with respective clusters of 2D primitives.

In an example, the 2D modeling tool can generate a connection between nodes (e.g., node 960A and node 960B) based on a graph-based search of the graph 900. The 2D modeling tool can set a node as a root node of the graph based search based on a type or property of the corresponding cluster and its closeness to a 2D contour of a room. That is, the 2D modeling tool can determine a type (e.g., point, line, corner, etc.) and/or a property (e.g., length) of the 2D primitive for the cluster. For instance, a node associated with a cluster having a 2D primitive that is a line may be selected as the root node instead of a node associated with a cluster having a 2D primitive that is a point. In addition, a node that is associated with a longest line among the lines may be selected as the root node. The 2D modeling tool can also determine a distance between the cluster and the 2D contour. A node associated with the shorted distance may be selected as the root node.

The graph-based searching can involve the 2D modeling tool generating a closed loop that starts and ends at a same node (e.g., node 960A) and connects remaining nodes (e.g., nodes 960B-960F) of the graph 900. A property of the closed loop (e.g., an intersection between the closed loop and the 2D contour, a number of line angles below a threshold value, or a number of connected 2D primitives) can be determined. Based on the property, a perimeter of a 2D plan 265 can be set as the closed loop. The 2D plan 265 includes the connections generated between the nodes 960A-960B.

In an example, if the type, the property of the closed loop does not satisfy its respective threshold, the 2D modeling tool may perform another graph-based search of another graph to determine the perimeter and generate the 2D plan. The other graph can include a re-arrangement of the nodes 960A-960B from the graph 900. The connections between nodes from the graph-based search may be stored and recalled for the other graph-based search to accelerate the graph searching. Another closed loop is generated, and another property is determined until the property is satisfactory and the perimeter is set.

Figure 10:
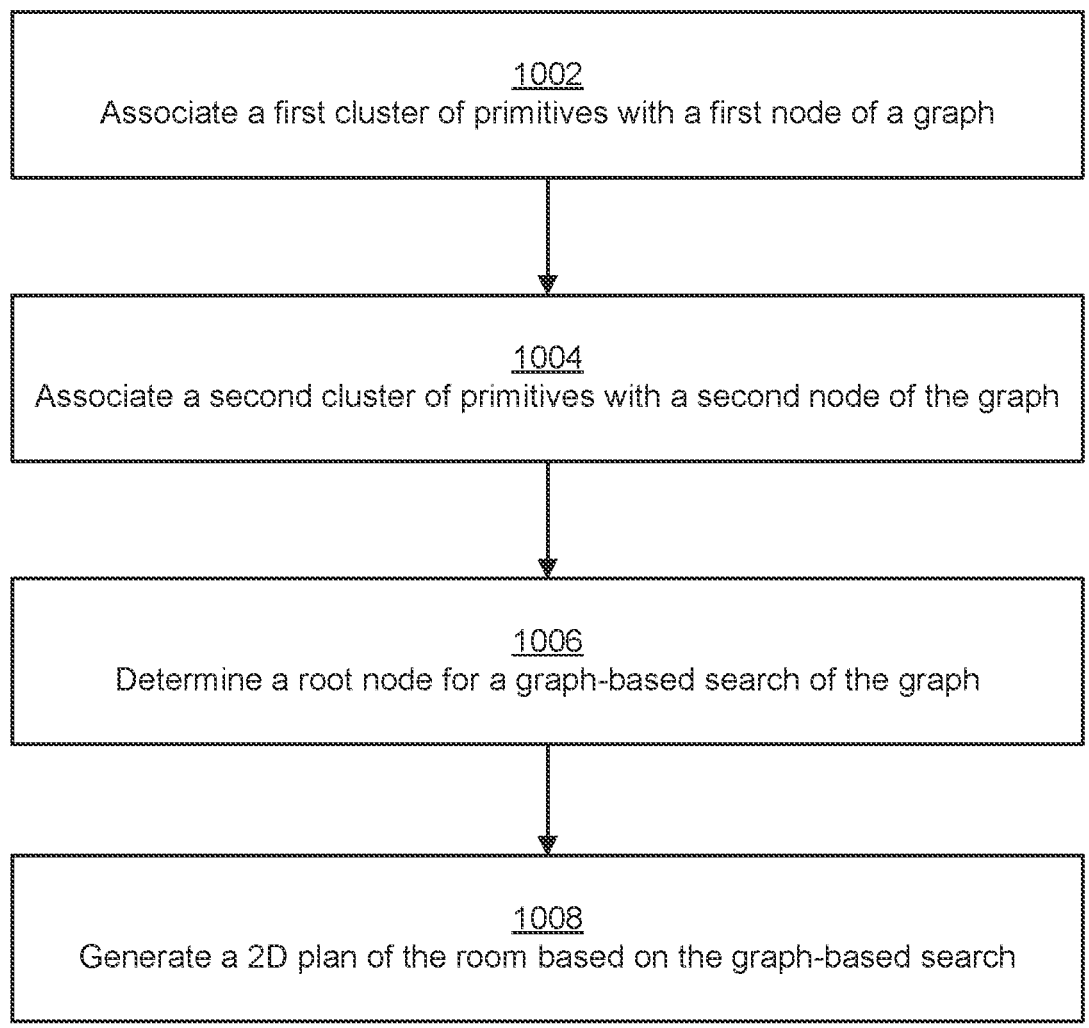
FIG. 10 illustrates an example flow of a process for graph-based searching in floor plan generation according to an embodiment of the disclosure.

FIG. 10 illustrates an example flow of a process for graph-based searching in floor plan generation according to an embodiment of the disclosure. In some embodiments, the process may be performed by a computer system described herein (e.g., device 110 of FIG. 1). The process (described below) is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

In an example, the flow includes operation 1002, where the computer system associates a first cluster of primitives with a first node of a graph. The first cluster of primitives can include a first 2D primitive. The primitives represent significant geometric features of a room.

In an example, the flow includes operation 1004, where the computer system associates a second cluster of primitives with a second node of graph. The second cluster of primitives can include a second 2D primitive.

In an example, the flow includes operation 1006, where the computer system determines a root node for a graph-based search of the graph. A type or a property of each of the first 2D primitive of the first cluster and the second 2D primitive of the second cluster can be determined. In addition, a distance between the first cluster and a 2D contour of the room and a distance between the second cluster and the 2D contour can be determined. Based on the distances and the type and/or the property, the first node or the second node can be set as the root node.

In an example, the flow includes operation 1008, where the computer system generates a 2D plan of the room based on the graph-based search. To generate the 2D plan, the computer system can generate multiple candidate 2D plans and determine the intersection of union (IOU) of each with the 2D contour. The candidate 2D plan that has the best IOU (e.g., the highest value) is selected as the 2D plan. Alternatively, the computer system can input the 2D contour and each candidate 2D plan into a machine learning model that outputs a match score for each candidate 2D plan. The computer system the candidate 2D plan with the largest score as the 2D plan. As another example, the computer system can input the 2D contour and node definitions of the graph into a machine learning model that outputs the 2D plan. The computer system can generate a closed loop that starts at the root node, ends at the root node, and connects remaining nodes of the graph. The closed loop can include connections that are generated between the nodes in the graph. A property of the closed loop can be determined and then a perimeter of the 2D plan can be set as the closed loop if the property satisfies a threshold.

In an example, after primitive merging and projection in 2D, a limited set of primitives can be acquired for each room. The graph-based search can generate a polygon based on the primitives. All primitives are ordered by projecting them on a rough room contour and sorting them clockwisely. A directed graph can be constructed with clockwisely cyclic descendants. To avoid full connections between all pairs of primitives, the graph is pruned with neighborhood information and directional changes. Each path that starts and ends at the same node may be used to close a polygon, and the real floor plan may overlap with one of the paths if there is enough primitive coverage in the room. Now the problem is formulated as finding all cyclic paths in the graph and selecting a path as the final floor plan from all candidates. A depth first search (DFS) is used to find all cyclic paths from the graph with a point-to-point, point-to-line, line-to-point, line-to-line connection strategy. Although the search space could be prohibitively large, the search efficiency is accelerated with state memorization so that the problem is solved in a dynamic programming fashion. All candidates are then ranked with a polygon goodness score which was defined by considering the intersection over union (IoU) between the polygon and the rough room contour, the number of undesired angles (e.g., a 20-degree angle between two walls), and the number of leveraged primitives weighted by confidence.

Figure 11:
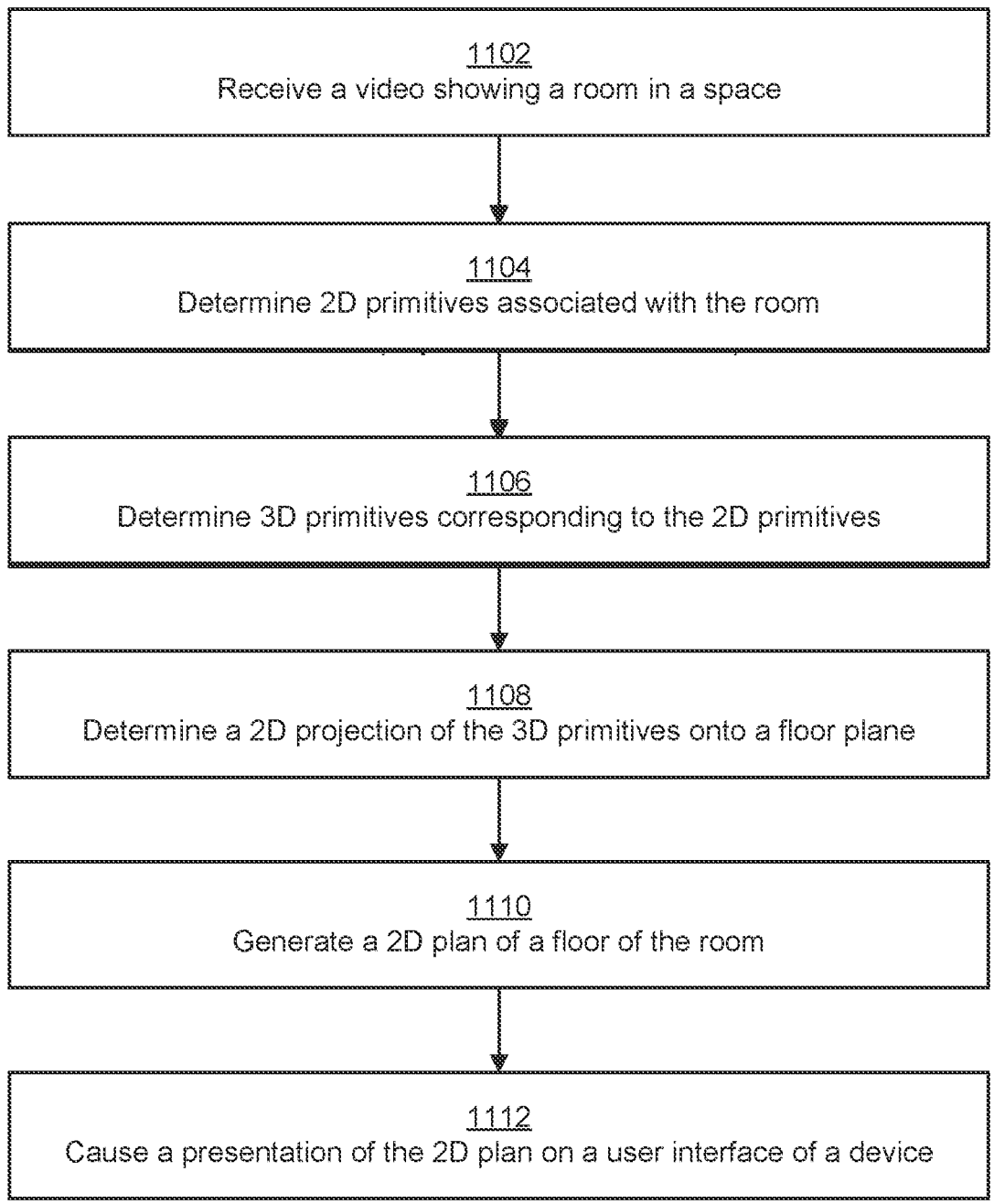
FIG. 11 illustrates an example of a flow for a process of primitive processing to determine a two-dimensional plan according to an embodiment of the disclosure.

FIG. 11 illustrates an example of a flow for a process of primitive processing to determine a 2D plan according to an embodiment of the disclosure. In some embodiments, the process may be performed by a computer system described herein (e.g., device 110 of FIG. 1). The process (described below) is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

In an example, the flow includes operation 1102, where the computer system receives a video showing a room in a space. The video is generated by a camera of a device.

In an example, the flow includes operation 1104, where the computer system determines 2D primitives associated with the room. A first image frame of the video is used as input to an ML model that determines the 2D primitives in an image plane. The 2D primitives can include a floor corner point, a floor line, a ceiling corner point, a ceiling line, and an object.

In an example, the flow includes operation 1106, where the computer system determines 3D primitives corresponding to the 2D primitives. The computer system can use camera pose data associated with the first image frame, the 2D primitives, and at least one of a 3D model representation of the room or a set of ceiling and floor planes of the room to determine the 3D primitives.

In an example, the flow includes operation 1108, where the computer system determines a 2D projection of the 3D primitives onto a floor plane. The computer system uses a 2D contour of the room indicated by the 3D model representation defined in the floor plane to determine the 2D projection. The 2D projection includes another set of 2D primitives in the floor plane.

In an example, the flow includes operation 1110, where the computer system generates a 2D plan of a floor of the room. The computer system generates the 2D floor plan by performing primitive registration, primitive filtering, primitive clustering, and graph-based searching, as described in FIGS. 3-10.

In an example, the flow includes operation 1112, where the computer system causes a presentation of the 2D plan on a user interface of the device. The computer system can send the 2D floor plan to the device, which then presents the 2D floor plan on the user interface.

Figure 12:
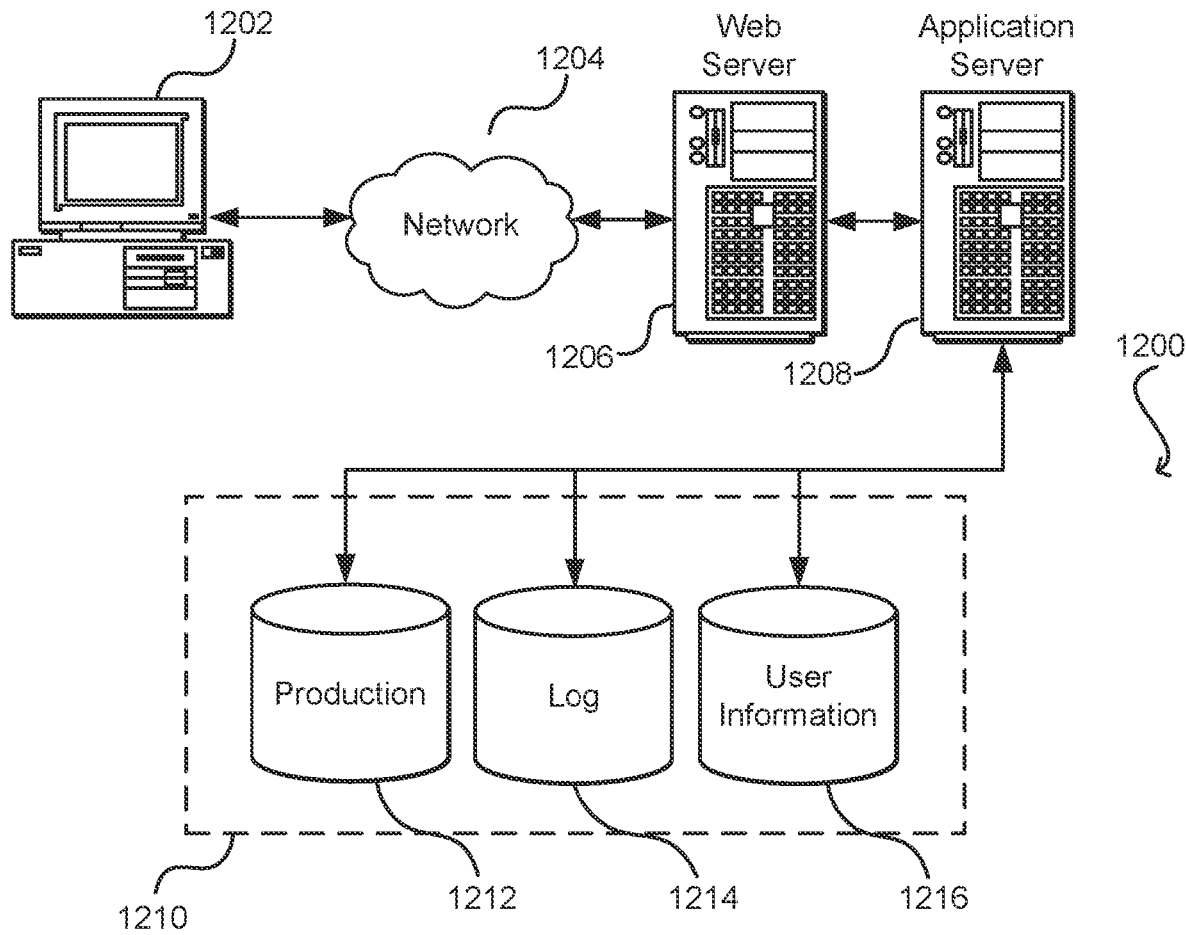
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   one or more processors; and
   one or more memory storing instructions that, upon execution by the one or more processors, cause the system to:
      receive a video showing a room in a space, the video generated by a camera of a device;
      determine, by using a first image frame of the video as an input to a machine learning (ML) model, a first plurality of two-dimensional (2D) primitives associated with the room, the first plurality of 2D primitives in an image plane and including a floor corner point, a floor line, a ceiling corner point, a ceiling line, and an object;
      determine, by using camera pose data associated with the first image frame, the first plurality of 2D primitives, and at least one of a three-dimensional (3D) model representation of the room or a set of ceiling and floor planes of the room, a plurality of 3D primitives each corresponding to one of the first plurality of 2D primitives;
      determine, by using a 2D contour of the room defined in a floor plane, a first 2D projection of the plurality of 3D primitives onto the floor plane, the 2D contour determined from the 3D model representation, the first 2D projection including a second plurality of 2D primitives in the floor plane;
      generate, by connecting the second plurality of 2D primitives to each other, a first 2D plan of a floor of the room; and
      cause a presentation of the first 2D plan on a user interface of the device.

2. The system of claim 1, wherein the one or more memory store further instructions that, upon execution by the one or more processors, cause the system to:
   determine, by using a second image frame of the video, a second 2D projection that includes a third plurality of 2D primitives in the image plane; and
   associate a first 2D primitive of the second plurality of 2D primitives and a second 2D primitive of the third plurality of 2D primitives with a first primitive cluster, wherein connecting the second plurality of 2D primitives to each other comprises connecting the first primitive cluster with a second primitive cluster.

3. The system of claim 1, wherein the one or more memory store further instructions that, upon execution by the one or more processors, cause the system to:
   associate a first 2D primitive of the second plurality of 2D primitives with a first primitive cluster, wherein the first primitive cluster is represented as a first node in a graph;
   associate a second 2D primitive of the second plurality of 2D primitives with a second primitive cluster, wherein the second primitive cluster is represented as a second node in the graph; and
   generate a connection between the first node and the second node by using a graph-based search of the graph, wherein the first 2D plan includes the connection.

4. The system of claim 1, wherein the room is a first room shown in a first portion of the video, and wherein the one or more memory store further instructions that, upon execution by the one or more processors, cause the system to:
   generate, by using a second image frame from a second portion of the video, a second 2D plan associated with a second room, wherein the second room is shown in the second portion;
   determine a 2D primitive that is common to the first room and the second room and that is of a particular type; and
   generate a relative arrangement between the first 2D plan and the second 2D plan, wherein the relative arrangement corresponds to the first room and the second room being adjacent to each other.

5. A computer-implemented method comprising:
   determining, based at least in part on a first image frame as an input to a machine learning (ML) model, first two-dimensional (2D) primitives defined in an image plane, the first 2D primitives being of different types and associated with a room;
   determining, based at least in part on camera pose data associated with the first image frame and the first 2D primitives, a first three-dimensional (3D) primitive corresponding to the first 2D primitives;
   determining, based at least in part on a 2D contour of the room defined in a projection plane, a 2D projection of the first 3D primitive onto the projection plane, the 2D projection including second 2D primitives defined in the projection plane, each one of the second 2D primitives corresponding to one or more of the first 2D primitives; and
   generating, based at least in part on the second 2D primitives, a 2D plan of associated with the room.

6. The computer-implemented method of claim 5, wherein determining the first 3D primitive comprises:
   registering the first 2D primitives into a 3D space based at least in part on the camera pose data and a 3D model representation of the room, wherein the first 2D primitives are defined in an image space, wherein the second 2D primitives are at scale to the first 2D primitives, and wherein the 3D model representation is defined in the 3D space.

7. The computer-implemented method of claim 6, wherein the first 2D primitives includes a line, and wherein registering the first 2D primitives comprises:
   determining a plurality of 2D points belonging to the line based at least in part on a sampling of the line;
   determining a plurality of 3D points by registering each one of the plurality of 2D points into the 3D space; and
   estimating the first 3D primitive based at least in part on an iterative method applied to the plurality of 3D points.

8. The computer-implemented method of claim 5, further comprising:
   determining, based at least in part on the camera pose data and a 3D model representation of the room, a plane different than the projection plane, wherein the 2D plan is generated based at least in part on the plane.

9. The computer-implemented method of claim 8, wherein determining the first 3D primitive comprises:
   registering the first 2D primitives into the plane based at least in part on the camera pose data, wherein the first 2D primitives are defined in an image space, and wherein the 3D model representation is defined in a 3D space.

10. The computer-implemented method of claim 5, wherein determining the first 3D primitive comprises:
    determining a first candidate 3D primitive by registering the first 2D primitives into a 3D space based at least in part on the camera pose data and a 3D model representation of the room;
    determining a second candidate 3D primitive by registering the first 2D primitives into a plane associated with the room; and
    determining a match between the first candidate 3D primitive and the second candidate 3D primitive, wherein the first 3D primitive is set as one of the first candidate 3D primitive or the second candidate 3D primitive based at least in part on the match.

11. The computer-implemented method of claim 5, further comprising:
    setting the 2D projection as a candidate 2D primitive; and
    determining a match between the candidate 2D primitive and the 2D contour, wherein one of the second 2D primitives is set as the candidate 2D primitive based at least in part on the match.

12. The computer-implemented method of claim 11, wherein the candidate 2D primitive includes a line, and wherein determining the match comprises:
    determining that an orthogonal distance between the line and the 2D contour is less than a first threshold value; and
    determining that an angle between the line and the 2D contour is less than a second threshold value.

13. The computer-implemented method of claim 5, further comprising:
    setting the 2D projection as a candidate 2D primitive; and
    determining a type of the candidate 2D primitive, wherein one of the second 2D primitives is set as the candidate 2D primitive based at least in part on the type.

14. One or more computer-readable storage media storing instructions that, upon executions by one or more processors of a system, cause the system to perform operations comprising:
    determining, based at least in part on a first image frame as an input to a machine learning (ML) model, first two-dimensional (2D) primitives defined in an image space, the first 2D primitives being of different types and associated with a room;
    determining, based at least in part on camera pose data associated with the first image frame and the first 2D primitives, a first three-dimensional (3D) primitive corresponding to the first 2D primitives;
    determining, based at least in part on a 2D contour of the room defined in a projection plane, a 2D projection of the first 3D primitive onto the projection plane, the 2D projection including second 2D primitives defined in the projection plane, each one of the second 2D primitives corresponding to one or more of the first 2D primitives; and
    generating, based at least in part on the second 2D primitives, a 2D plan associated with the room.

15. The one or more non-transitory computer-readable storage media of claim 14, wherein the operations further comprise:
    determining, based at least in part on a second image frame, a third 2D primitive defined in the projection plane; and
    associating a fourth 2D primitive of the second 2D primitives and the third 2D primitive in a cluster, wherein the 2D plan is generated based at least in part on the cluster.

16. The one or more non-transitory computer-readable storage media of claim 15, wherein the fourth 2D primitive and the third 2D primitive include a first line and a second line, respectively, and wherein the fourth 2D primitive and the third 2D primitive are associated in the cluster by at least:
    performing a first hierarchical clustering on the fourth 2D primitive and the third 2D primitive based at least in part on a distance between the first line and the second line; and
    performing a second hierarchical clustering on the fourth 2D primitive and the third 2D primitive based at least in part on a first direction of the first line and a second direction of the second line.

17. The one or more non-transitory computer-readable storage media of claim 14, wherein the operations further comprise:
    associating a cluster of primitives with a first node of a graph, wherein the cluster comprises one of the second 2D primitives; and
    generating a connection between the first node and a second node of the graph based at least in part on a graph-based search of the graph, wherein the 2D plan includes the connection.

18. The one or more non-transitory computer-readable storage media of claim 17, wherein the operations further comprise:
    determining at least one of a type or a property of the cluster;
    determining a distance between the cluster and the 2D contour; and
    setting the first node as a root node of the graph-based search based at least in part on the distance and the at least one of the type or the property.

19. The one or more non-transitory computer-readable storage media of claim 17, wherein the operations further comprise:

generating a closed loop that starts at the first node, ends at the first node, and connects remaining nodes of the graph;

determining a property of the closed loop, wherein the property includes at least one of an intersection between the closed loop and the 2D contour, a number of line angles below a threshold value, or a number of connected 2D primitives; and setting a permitter of the 2D plan as the closed loop based at least in part on the property.

20. The one or more non-transitory computer-readable storage media of claim 17, wherein the graph and the graph-based search of the graph are a first graph and a first graph-based search of the graph, respectively, and wherein the operations comprise:

storing, in a memory buffer, the connection; and performing a second graph-based search of a second graph, wherein the second graph corresponds to a re-arrangement of nodes of the first graph, and wherein the second graph-based search of the graph recalls the connection stored from the memory buffer.

\* \* \* \* \*